United States Patent
Lu

(10) Patent No.: US 10,452,728 B2
(45) Date of Patent: Oct. 22, 2019

(54) METHOD AND APPARATUS FOR RECOMMENDING KEYWORDS

(71) Applicant: Tencent Technology (Shenzhen) Company Limited, Shenzhen, Guangdong (CN)

(72) Inventor: Sixi Lu, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 481 days.

(21) Appl. No.: 14/752,076

(22) Filed: Jun. 26, 2015

(65) Prior Publication Data

US 2015/0294018 A1    Oct. 15, 2015

Related U.S. Application Data

(63) Continuation of application No. PCT/CN2013/088175, filed on Nov. 29, 2013.

(30) Foreign Application Priority Data

Jan. 25, 2013 (CN) .......................... 2013 1 0029622

(51) Int. Cl.
*G06F 16/9535* (2019.01)
*G06F 16/957* (2019.01)
(Continued)

(52) U.S. Cl.
CPC ...... *G06F 16/9535* (2019.01); *G06F 16/3322* (2019.01); *G06F 16/90328* (2019.01); *G06F 16/9574* (2019.01)

(58) Field of Classification Search
CPC ......... G06F 17/30864; G06F 17/30477; G06F 17/30657; G06F 17/30038;
(Continued)

(56) References Cited

U.S. PATENT DOCUMENTS 6,938,031 B1 * 8/2005 Zoltan ............... G06F 17/30864
707/771
2002/0120712 A1 * 8/2002 Maislin ............. G06F 17/30864
709/217
(Continued)

FOREIGN PATENT DOCUMENTS

CN    101853308 A    10/2010
CN    102654868 A    9/2012

OTHER PUBLICATIONS

Tencent Technology, ISRWO, PCT/CN2013/088175, Mar. 6, 2014, 8 pgs.

(Continued)

*Primary Examiner* — Amanda L Willis
*Assistant Examiner* — Vaishali Shah
(74) *Attorney, Agent, or Firm* — Morgan, Lewis & Bockius LLP

(57) ABSTRACT

A method for recommending keywords can receive a first search term entered by a user, search a keyword library comprising a plurality of keywords and retrieve a preset number of keywords based on a similarity coefficient between each keyword and the first search term. After receiving a second search term entered by the user, the method obtains a correlation value between the second search term and the first search term based on whether a webpage in a search result of the first search term visited by the user includes the second search term, and determines the similarity coefficient between the second search term and the first search term in accordance with the correlation value. And then, the method updates the keyword library to save the similarity coefficient between the second search term and the first search term.

9 Claims, 4 Drawing Sheets

(51) Int. Cl.
*G06F 16/9032* (2019.01)
*G06F 16/332* (2019.01)

(58) Field of Classification Search
CPC .......... G06F 17/30274; G06F 16/9535; G06F 16/3322; G06F 16/9574; G06F 16/90328
See application file for complete search history.

(56) References Cited

U.S. PATENT DOCUMENTS

| | | | | |
|---|---|---|---|---|
| 2003/0065706 | A1* | 4/2003 | Smyth | G06F 17/30867 709/200 |
| 2010/0262692 | A1* | 10/2010 | Zhang | G06F 17/30867 709/224 |
| 2012/0158837 | A1* | 6/2012 | Kaul | H04L 51/24 709/204 |
| 2012/0246153 | A1* | 9/2012 | Pehle | G06F 17/30864 707/723 |
| 2013/0110496 | A1* | 5/2013 | Heidasch | G06F 17/2795 704/9 |
| 2013/0143608 | A1* | 6/2013 | Lin | H04M 1/72547 455/466 |
| 2013/0148881 | A1* | 6/2013 | Xue | G06K 9/6256 382/159 |
| 2015/0169749 | A1* | 6/2015 | Camelo | G06F 16/95 707/706 |

OTHER PUBLICATIONS

Tencent Technology, IPRP, PCT/CN2013/088175, Jul. 28, 2015, 6 pgs.

\* cited by examiner

METHOD AND APPARATUS FOR RECOMMENDING KEYWORDS

CROSS-REFERENCE TO RELATED APPLICATIONS

This application is a continuation of International Patent Application No. PCT/CN2013/088175, entitled "Method and Apparatus for Recommending Keywords," filed on Nov. 29, 2013. This application claims the benefit and priority of Chinese Patent Application No. 201310029622.2, entitled "Method and Apparatus for Recommending Keywords," filed on Jan. 25, 2013. The entire disclosures of each of the above applications are incorporated herein by reference.

TECHNICAL FIELD

The present invention relates to the field of the internet, and more particularly, to a method and apparatus for recommending keywords.

BACKGROUND

The existing search engines recommend keywords based on the meaning of the search term entered by the user. For example, if a user enters the term mushroom, Baidu displays the following keywords: "mushrooms recipes", "mushroom and rape", "mushroom chicken stew"; while Google displays the following keywords: "Mushroom Street", "mushroom.com", "mushroom soup," and so on. All these keywords are selected based on its meaning.

The existing methods of recommending keywords presume that the user knows exactly what he is searching, and recommend keywords similar in meaning to the search term entered by the user. However, if the user cannot accurately describe what he is searching for, or cannot provide a good search term, the user will have to manually filter through the search result to modify the search term. For example, if a user wants to search for articles on the effects of modifying codes, and searches for "effects modifying codes," the search result will includes articles on "effects" or "modifying codes." In reviewing the search results, the user may realize that the relevant academic term is "change centric testing", and search for "change centric testing." The terms "effects modifying codes" and "change centric test" are not semantically similar, and the prior art methods will not be able to make the connection.

SUMMARY OF THE INVENTION

In accordance with embodiments of the present invention provide, a method and apparatus for recommending keywords is provided to address the issues in the prior art where the search engine can only recommend keywords that are similar in meaning to the search term.

In accordance with embodiments of the present invention, a method for recommending keywords is provided, the method comprising: receiving a first search term entered by a user; searching a keyword library comprising a plurality of keywords and retrieving a preset number of keywords based on a similarity coefficient between each keyword and the first search term; receiving a second search term entered by the user; obtaining a correlation value between the second search term and the first search term based on whether a webpage in a search result of the first search term visited by the user comprises the second search term, and determining the similarity coefficient between the second search term and the first search term in accordance with the correlation value; and updating the keyword library to save the similarity coefficient between the second search term and the first search term.

In accordance with embodiments of the present invention, an apparatus for recommending keywords is provided, the apparatus comprising: a first receiving module configured to receive a first search term entered by a user; a search module configured to search a keyword library comprising a plurality of keywords and retrieving a preset number of keywords based on a similarity coefficient between each keyword and the first search term; a second receiving module configured to receive a second search term entered by the user; a calculating module configured to obtain a correlation value between the second search term and the first search term based on whether a webpage in a search result of the first search term visited by the user comprises the second search term, and determine the similarity coefficient between the second search term and the first search term in accordance with the correlation value; and an updating module configured to update the keyword library to save the similarity coefficient between the second search term and the first search term.

In accordance with embodiments of the present invention, a first search term and the websites in a search result of the first search term visited by the user are recorded, the websites in the search result of the first search term visited by the user are parsed to determine whether they contain a second search term, and if so, a correlation between the first search term and the second search term is determined, even if the first search term and the second search terms are not similar in meaning, and the second search term is updated to a keyword library. The embodiments of the present invention address the issue in the prior art where the search engine can only recommend keywords based on the meaning, and can recommend keywords that are not similar in meaning based on contexts.

BRIEF DESCRIPTION OF THE DRAWINGS

To better illustrate the technical features of the embodiments of the present invention, various embodiments of the present invention will be briefly described in conjunction with the accompanying drawings. It is obvious that the drawings are but for exemplary embodiments of the present invention, and that a person of ordinary skill in the art may derive additional drawings without deviating from the principles of the present invention.

DESCRIPTION OF THE PREFERRED EMBODIMENTS

To better illustrate the purpose, technical feature, and advantages of the embodiments of the present invention, various embodiments of the present invention will be further described in conjunction with the accompanying drawings. It is obvious that the embodiments are but for exemplary embodiments of the present invention, and not all embodiments of the present invention. A person of ordinary skill in the art may derive additional embodiments without deviating from the principles of the present invention.

Figure 1:
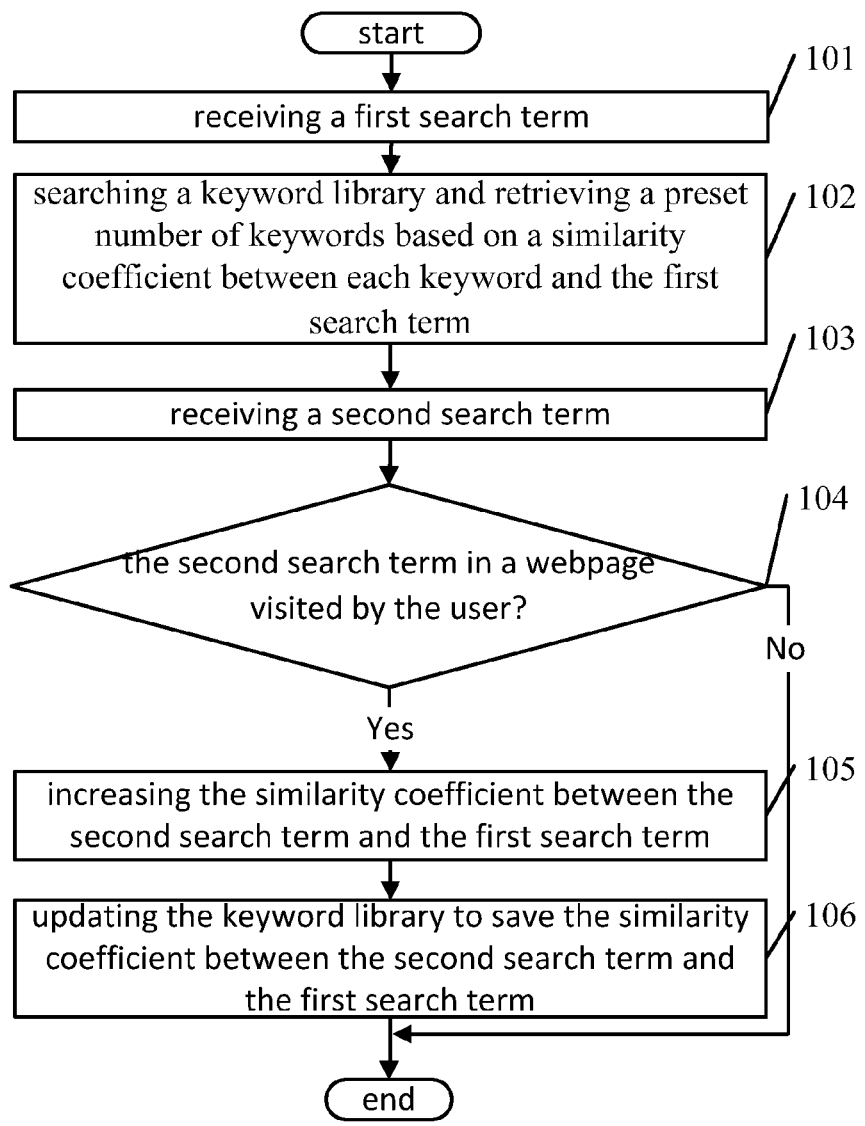
FIG. 1 is an exemplary flowchart for a method for recommending keywords in accordance with an embodiment of the present invention.

FIG. 1 is an exemplary flowchart for a method for recommending keywords in accordance with an embodiment of the present invention. As shown in FIG. 1, the method includes the following steps:

Step 101: receiving a first search term entered by a user.

Step 102: searching a keyword library comprising a plurality of keywords and retrieving a preset number of keywords based on a similarity coefficient between each keyword and the first search term.

Here, the user inputs the first search term in a search engine, which has a keyword library comprising a plurality of keywords. After receiving the first search term, the search engine calculates the similarity coefficient between each keyword in the keyword library and the first search term, sorts the keywords based on the similarity coefficients, and returns a preset number of keywords to the user. At the same time, the search engine generates a search result for the first search term in accordance with a preset search algorithm. The search result is usually a collection of webpage links. The search engine also records and saves the webpages visited by the user in a browser history. For example, if the first search term is A0 and the preset keyword library has keywords {A10, A8, A6, A1, A5, A2, A3, A4, A7, A9}, the search engine calculates the similarity coefficient between the first search term A0 and each keywords in the keyword library, where a large similarity coefficient indicates strong similarity between the first search term and the keyword. If the keywords are sorted as {A10, A9, A8, A7, A6, A5, A4, A3, A2, A1}, and the search engine needs to return five keywords, then the search engine will return {A10, A9, A8, A7, A6} to the user's search page.

Step 103: receiving a second search term entered by the user.

The search engine receives a second search term that is different from the first search term. For example, the second search term is B0.

Step 104: determining whether a webpage in a search result of the first search term visited by the user comprises the second search term.

Here, the webpages in the search result of the first search term visited by the user saved in the browser history in step 102 are retrieved to determine whether the visited webpages contain the second search term, or whether there is correlation between the second search term and the first search term. If the user visited the webpage "www.sample1.com", and the second search term B0 is found on this webpage, proceed to Step 105. If the second search term B0 is not found in this webpage, then the process ends. The fact that the search term B0 is found on this webpage, or that there is correlation between B0 and A0, indicates that B0 and A0 have some similarity.

Step 105: increasing the similarity coefficient between the second search term and the first search term.

Here, the similarity coefficient between the second search term and the first search term is determined in accordance with the correlation between the second search term and the first search term. For example, if a webpage in the search result of the first search term visited by the user contains the second search term, then the correlation value between the first search term and the second search term is increased by 1, and the similarity coefficient between the first search term and the second search term is also increased by 1. A high correlation value between the second search term and the first search term indicates a strong similarity. The similarity coefficient between the second search term and the first search term can be determined using other methods, and the present invention is not limited to any particular method of calculating the similarity coefficient.

Step 106: updating the keyword library to save the similarity coefficient between the second search term and the first search term.

Here, as the second search term has some similarity with the first search term, the search engine saves the second search term and the similarity coefficient between the second search term and the first search term in the keyword library. When a user searches for the first search term next time, the search engine will calculate the similarity coefficient of the second search term. In accordance with the preset algorithm in Step 104, if the correlation value between the second search term and the first search term is large, then the second search term will have a large similarity coefficient, and the search engine may recommend the second search term to the user.

In accordance with this embodiment of the present invention, a first search term and the websites in a search result of the first search term visited by the user are recorded, the websites in the search result of the first search term visited by the user are parsed to determine whether they contain a second search term, and if so, a correlation between the first search term and the second search term is determined, even if the first search term and the second search terms are not similar in meaning, and the second search term is updated to a keyword library. This embodiment of the present invention addresses the issue in the prior art where the search engine can only recommend keywords based on the meaning, and can recommend keywords that are not similar in meaning based on contexts.

Figure 2:
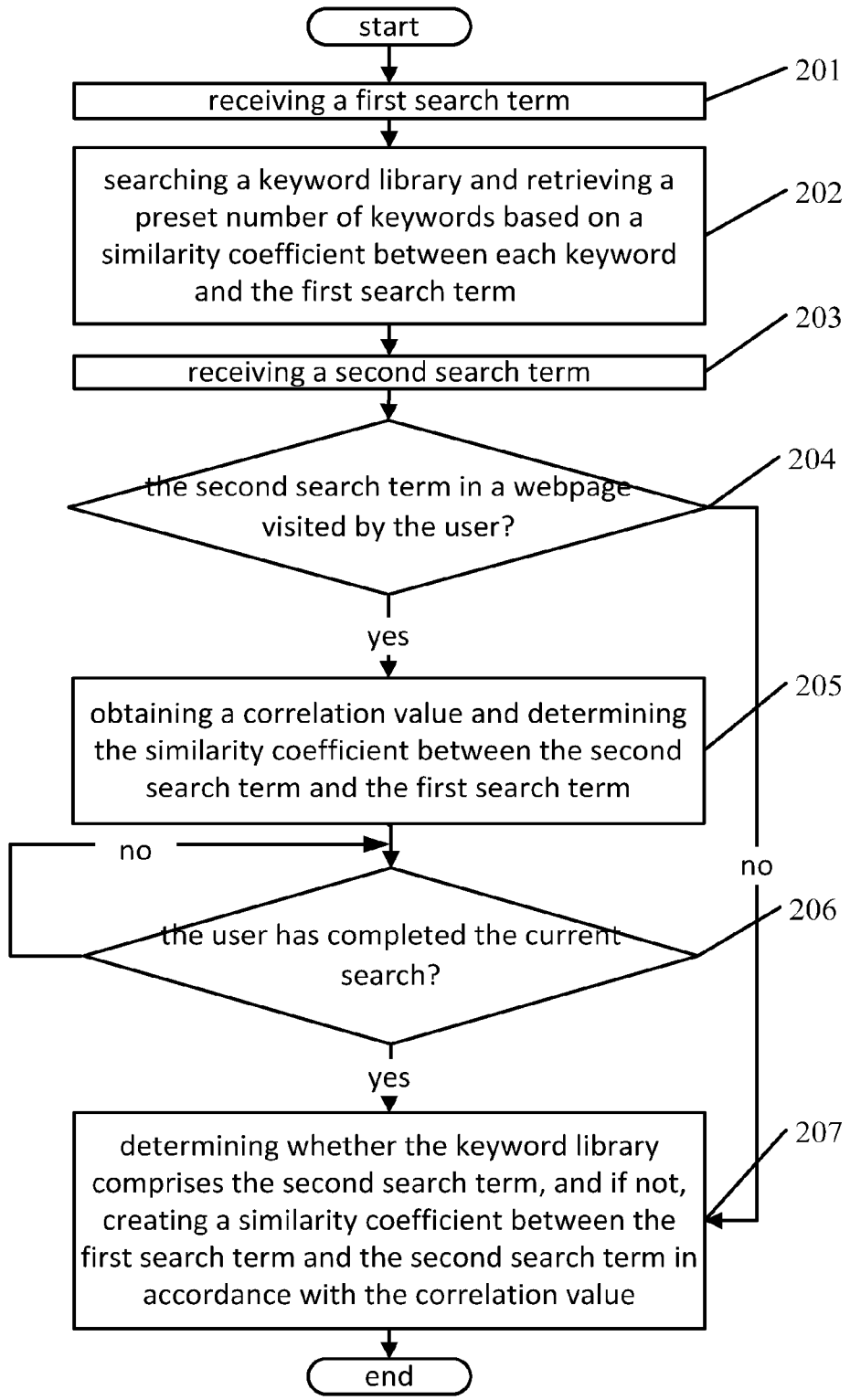
FIG. 2 is an exemplary flowchart for a method for recommending keywords in accordance with another embodiment of the present invention.

FIG. 2 is an exemplary flowchart for a method for recommending keywords in accordance with another embodiment of the present invention. As shown in FIG. 2, the method includes the following steps:

Step 201: receiving a first search term entered by a user.

Step 202: searching a keyword library comprising a plurality of keywords and retrieving a preset number of keywords based on a similarity coefficient between each keyword and the first search term.

Here, the user inputs the first search term in a search engine, which has a keyword library comprising a plurality of keywords. After receiving the first search term, the search engine calculates the similarity coefficient between each keyword in the keyword library and the first search term, sorts the keywords based on the similarity coefficients, and returns a preset number of keywords to the user. At the same time, the search engine generates a search result for the first search term in accordance with a preset search algorithm. The search result is usually a collection of webpage links. The search engine also records and saves the webpages visited by the user in a browser history. For example, if the first search term is A0 and the preset keyword library has keywords {A10, A8, A6, A1, A5, A2, A3, A4, A7, A9}, the search engine calculates the similarity coefficient between the first search term A0 and each keywords in the keyword library, where a large similarity coefficient indicates strong similarity between the first search term and the keyword. If the keywords are sorted as {A10, A9, A8, A7, A6, A5, A4, A3, A2, A1}, and the search engine needs to return five keywords, then the search engine will return {A10, A9, A8, A7, A6} to the user's search page.

Step 203: receiving a second search term entered by the user.

The search engine receives a second search term that is different from the first search term. For example, the second search term is B0.

Step 204: determining whether a webpage in a search result of the first search term visited by the user comprises the second search term.

Here, the webpages in the search result of the first search term visited by the user saved in the browser history in step 202 are retrieved to determine whether the visited webpages contain the second search term, or whether there is correlation between the second search term and the first search term. If the user visited the webpage "www.sample1.com", and the second search term B0 is found on this webpage, proceed to Step 205. If the second search term B0 is not found in this webpage, then the process ends. The fact that the search term B0 is found on this webpage, or that there is correlation between B0 and A0, indicates that B0 and A0 have some similarity.

Step 205: obtaining a correlation value between the second search term and the first search term, and determining the similarity coefficient between the second search term and the first search term.

The second search term and the first search term may not be similar in meaning, and their similarity coefficient may be so small that the search engine does not recommend the second search term. However, the second search term and the first search term may be related to similar contents, and method is needed to increase the similarity coefficient between the first search term and the second search term. One method is to determine the similarity coefficient between the second search term and the first search term in accordance with the correlation between the second search term and the first search term. For example, if a webpage in the search result of the first search term visited by the user contains the second search term, then the correlation value between the first search term and the second search term is increased by 1, and the similarity coefficient between the first search term and the second search term is also increased by 1. A high correlation value between the second search term and the first search term indicates a strong similarity.

Step 206: determining whether the user has completed the current search.

Here, a third search term entered by the user is received, and if none of the webpages in the search result of the first search term visited by the user contains the third search term, then the user must have completed the current search, and proceed to Step 207. Otherwise, repeat this step.

Step 207: determining whether the keyword library comprises the second search term, and if not, creating a similarity coefficient between the first search term and the second search term in accordance with the correlation value.

Here, the first search term and its related keywords are stored in the keyword library as a table. If the first search term is not in the table, then add a row in the table. If a row for the first search term already exists in the table, but there is no column for the second search term, then add a column for the second search term, and set the similarity efficiency as 1. In the next search, the keywords with high similarity efficiency will be displayed.

In accordance with this embodiment of the present invention, a first search term and the websites in a search result of the first search term visited by the user are recorded, the websites in the search result of the first search term visited by the user are parsed to determine whether they contain a second search term, and if so, a correlation between the first search term and the second search term is determined, even if the first search term and the second search terms are not similar in meaning, and the second search term is updated to a keyword library. This embodiment of the present invention addresses the issue in the prior art where the search engine can only recommend keywords based on the meaning, and can recommend keywords that are not similar in meaning based on contexts.

Figure 3:
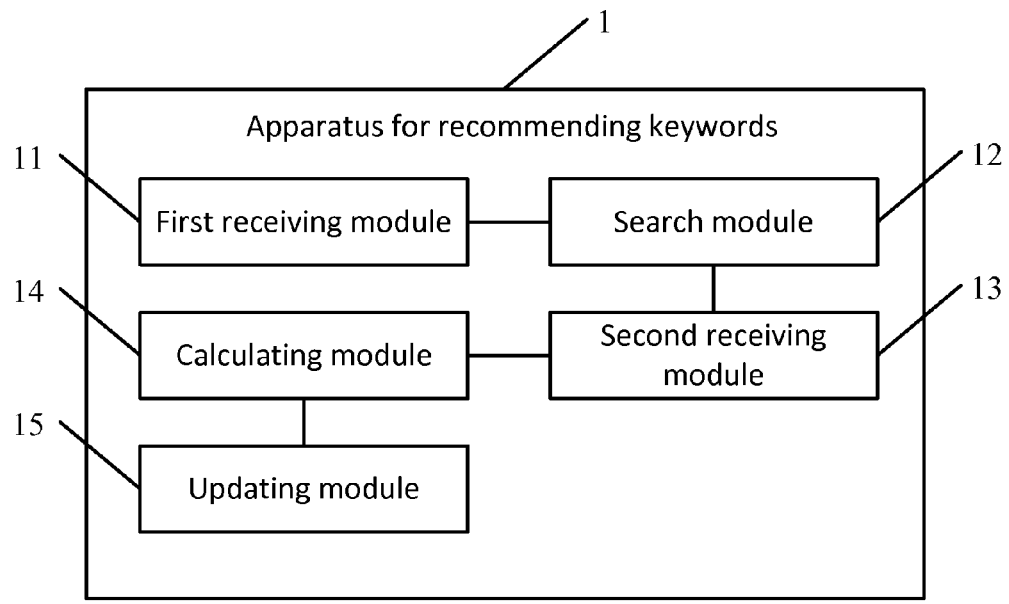
FIG. 3 is an exemplary schematic diagram for an apparatus for recommending keywords in accordance with an embodiment of the present invention.

FIG. 3 is an exemplary schematic diagram for an apparatus for recommending keywords in accordance with an embodiment of the present invention. As shown in FIG. 3, the apparatus includes a first receiving module 11, a search module 12, a second receiving module 13, a calculating module 14 and an updating module 15.

The first receiving module 11 is used for receiving a first search term entered by a user.

The search module 12 is used for searching a keyword library comprising a plurality of keywords and retrieving a preset number of keywords based on a similarity coefficient between each keyword and the first search term.

Here, the user inputs the first search term in a search engine, which has a keyword library comprising a plurality of keywords. After receiving the first search term, the search module 12 calculates the similarity coefficient between each keyword in the keyword library and the first search term, sorts the keywords based on the similarity coefficients, and returns a preset number of keywords to the user. At the same time, the search module 12 generates a search result for the first search term in accordance with a preset search algorithm. The search result is usually a collection of webpage links. The search module 12 also records and saves the webpages visited by the user in a browser history. For example, if the first search term is A0 and the preset keyword library has keywords {A10, A8, A6, A1, A5, A2, A3, A4, A7, A9}, the search engine calculates the similarity coefficient between the first search term A0 and each keywords in the keyword library, where a large similarity coefficient indicates strong similarity between the first search term and the keyword. If the keywords are sorted as {A10, A9, A8, A7, A6, A5, A4, A3, A2, A1}, and the search engine needs to return five keywords, then the search engine will return {A10, A9, A8, A7, A6} to the user's search page.

The second receiving module 13 is used for receiving a second search term entered by the user.

The second receiving module 13 receives a second search term that is different from the first search term. For example, the second search term is B0.

The calculating module 14 is used for obtaining a correlation value between the second search term and the first search term based on whether a webpage in a search result of the first search term visited by the user comprises the second search term, and determining the similarity coefficient between the second search term and the first search term in accordance with the correlation value.

Here, the webpages in the search result of the first search term visited by the user saved in the browser history in the search module 12 are retrieved, the calculating module 14 determines whether the visited webpages contain the second search term, or whether there is correlation between the second search term and the first search term. If the user visited the webpage "www.sample1.com", and the second search term B0 is found on this webpage, it would indicate that B0 and A0 have some similarity.

The calculating module 14 determines the similarity coefficient between the second search term and the first search term in accordance with the correlation between the second search term and the first search term. For example, if a webpage in the search result of the first search term visited by the user contains the second search term, then the correlation value between the first search term and the second search term is increased by 1, and the similarity coefficient between the first search term and the second search term is also increased by 1. A high correlation value between the second search term and the first search term indicates a strong similarity. The similarity coefficient between the second search term and the first search term can be determined using other methods, and the present invention is not limited to any particular method of calculating the similarity coefficient.

The updating module 15 is used for updating the keyword library to save the similarity coefficient between the second search term and the first search term.

In accordance with this embodiment of the present invention, a first search term and the websites in a search result of the first search term visited by the user are recorded, the websites in the search result of the first search term visited by the user are parsed to determine whether they contain a second search term, and if so, a correlation between the first search term and the second search term is determined, even if the first search term and the second search terms are not similar in meaning, and the second search term is updated to a keyword library. This embodiment of the present invention addresses the issue in the prior art where the search engine can only recommend keywords based on the meaning, and can recommend keywords that are not similar in meaning based on contexts.

Figure 4:
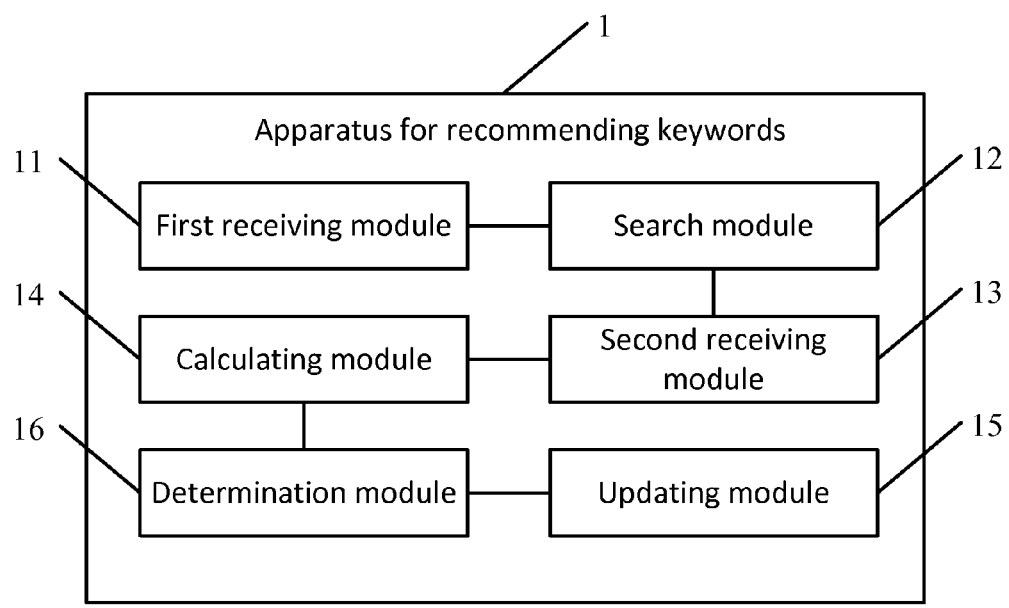
FIG. 4 is an exemplary schematic diagrams for an apparatus for recommending keywords in accordance with another embodiment of the present invention.
Figure 5:
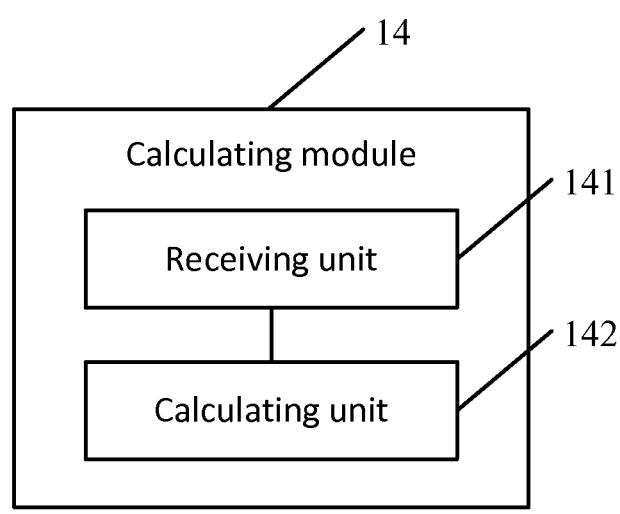
FIG. 5 is an exemplary schematic diagrams for a calculating module in an apparatus for recommending keywords in accordance with yet another embodiment of the present invention.

FIG. 4 is an exemplary schematic diagram for an apparatus for recommending keywords in accordance with another embodiment of the present invention. FIG. 5 is an exemplary schematic diagram for a calculating module in an apparatus for recommending keywords in accordance with yet another embodiment of the present invention. As shown in FIG. 4 and FIG. 5, the apparatus includes a first receiving module 11, a search module 12, a second receiving module 13, a calculating module 14 and an updating module 15, and a determination module 16 for receiving a third search term entered by the user, and determining whether the webpages in the search result of the first search term visited by the user comprises the third search term.

The determination module 16 is used for determining whether the current search has completed, and if so, directing the operation of the updating module 15.

The calculating module 14 includes an acquisition unit 141 for obtaining the correlation value between the second search term and the first search term; and a calculating unit 142 for increasing the similarity coefficient between the second search term and the first search term in accordance with the correlation value.

The updating module 15 is further used for determining whether the keyword library comprises the second search term, and if not, creating a similarity coefficient between the first search term and the second search term in accordance with the correlation value.

In accordance with this embodiment of the present invention, a first search term and the websites in a search result of the first search term visited by the user are recorded, the websites in the search result of the first search term visited by the user are parsed to determine whether they contain a second search term, and if so, a correlation between the first search term and the second search term is determined, even if the first search term and the second search terms are not similar in meaning, and the second search term is updated to a keyword library. This embodiment of the present invention addresses the issue in the prior art where the search engine can only recommend keywords based on the meaning, and can recommend keywords that are not similar in meaning based on contexts.

Those skilled in the art will understand that all or part of the embodiments of the present invention can be implemented by computer hardware, or by a computer program controlling the relevant hardware. The computer program can be stored in a computer readable storage media, which can be read-only memory, magnetic disk or optical disk, etc.

The various embodiments of the present invention are merely preferred embodiments, and are not intended to limit the scope of the present invention, which includes any modification, equivalent, or improvement that does not depart from the spirit and principles of the present invention.

What is claimed is:

1. A method for recommending keywords and identifying related keywords that are semantically dissimilar to a user-entered search term such that the related keywords are used as future keyword recommendations for said user-entered search term, the method comprising:

receiving a first search term entered by a first user for a first search;

in response to receiving the first search term entered by the first user:
  searching a keyword library comprising a plurality of keywords;
  retrieving a first subset of keywords based on a respective similarity coefficient between each keyword of the first subset of keywords and the first search term, wherein the first subset of keywords are provided to the first user as recommended keywords for replacing the first search term in the first search; and
  generating a search result for the first search term, wherein the search result includes a plurality of web links;

recording one or more webpages referenced in the search result that are visited by the first user;

receiving a second search term entered by the first user, wherein the second search term is not present among the first subset of keywords retrieved from the keyword library in response to the first search term entered by the first user, due to deficiency of a current value of a respective similarity coefficient between the first search term and the second search term in the keyword library, wherein the deficiency results at least in part from semantic dissimilarity between the first search term and the second search term;

determining whether the second search term entered by the first user is found within at least one of the one or more webpages referenced in the search result that are visited by the first user;

in accordance with a determination that the second search term entered by the first user is found within at least one of the one or more webpages referenced in the search result that are visited by the first user:
  obtaining a correlation value between the second search term and the first search term based on presence of the second search term in the at least one of the one or more webpages referenced in the search result that are visited by the first user;
  increasing the respective similarity coefficient between the second search term and the first search term in accordance with the correlation value; and
  updating the keyword library to save the respective similarity coefficient between the second search term and the first search term that has been increased in accordance with the correlation value between the second search term and the first search term; and in accordance with a determination that the second search term entered by the first user is not found within at least one of the one or more webpages referenced in the search result that are visited by the first user:

forgoing obtaining the correlation value between the second search term and the first search term;

receiving the first search term as a respective search term input by a second user after the keyword library has been updated to increase the respective similarity coefficient between the second search term and the first search term in accordance with the determination that the second search term entered by the first user is found within at least one of the one or more webpages referenced in the search result that are visited by the first user; and in response to receiving the first search term entered by the second user for a second search:

searching the updated keyword library and retrieving a second subset of keywords, wherein the second subset of keywords includes the second search term due to the increase in the respective similarity coefficient between the second search term and the first search term as a result of the update made in accordance with the determination that the second search term entered by the first user is found within at least one of the one or more webpages referenced in the search result that are visited by the first user, and wherein the second subset of keywords are presented to the second user as recommended keywords for replacing the first search term in the second search.

2. The method of claim 1, further comprising, prior to the step of updating the keyword library to save the respective similarity coefficient between the second search term and the first search term:

receiving a third search term entered by the first user, and if none of the webpages in the search result of the first search term visited by the first user comprises the third search term, updating the keyword library to save the respective similarity coefficient between the second search term and the first search term.

3. The method of claim 1, wherein the step of updating the keyword library to save the respective similarity coefficient between the second search term and the first search term further comprises:

determining whether the keyword library comprises the second search term, and if not, creating the respective similarity coefficient between the first search term and the second search term in accordance with the correlation value between the second search term and the first search term.

4. An apparatus for recommending keywords and identifying related keywords that are semantically dissimilar to a user-entered search term such that the related keywords are used as future keyword recommendations for said user-entered search term, the apparatus comprising:

a computer; and non-transitory computer-readable storage medium storing programs including instructions, which, when executed by the computer, cause the computer to perform operations comprising:

receiving a first search term entered by a first user for a first search;

in response to receiving the first search term entered by the first user:

searching a keyword library comprising a plurality of keywords;

retrieving a first subset of keywords based on a respective similarity coefficient between each keyword of the first subset of keywords and the first search term, wherein the first subset of keywords are provided to the first user as recommended keywords for replacing the first search term in the first search; and generating a search result for the first search term, wherein the search result includes a plurality of web links;

recording one or more webpages referenced in the search result that are visited by the first user;

receiving a second search term entered by the first user, wherein the second search term is not present among the first subset of keywords retrieved from the keyword library in response to the first search term entered by the first user, due to deficiency of a current value of a respective similarity coefficient between the first search term and the second search term in the keyword library, wherein the deficiency results at least in part from semantic dissimilarity between the first search term and the second search term;

determining whether the second search term entered by the first user is found within at least one of the one or more webpages referenced in the search result that are visited by the first user;

in accordance with a determination that the second search term entered by the first user is found within at least one of the one or more webpages referenced in the search result that are visited by the first user:

obtaining a correlation value between the second search term and the first search term based on presence of the second search term in the at least one of the one or more webpages referenced in the search result that are visited by the first user;

increasing the respective similarity coefficient between the second search term and the first search term in accordance with the correlation value; and updating the keyword library to save the respective similarity coefficient between the second search term and the first search term that has been increased in accordance with the correlation value between the second search term and the first search term; and in accordance with a determination that the second search term entered by the first user is not found within at least one of the one or more webpages referenced in the search result that are visited by the first user:

forgoing obtaining the correlation value between the second search term and the first search term;

receiving the first search term as a respective search term input by a second user after the keyword library has been updated to increase the respective similarity coefficient between the second search term and the first search term in accordance with the determination that the second search term entered by the first user is found within at least one of the one or more webpages referenced in the search result that are visited by the first user; and in response to receiving the first search term entered by the second user for a second search:

searching the updated keyword library and retrieving a second subset of keywords, wherein the second subset of keywords includes the second search term due to the increase in the respective similarity coefficient between the second search term and the first search term as a result of the update made in accordance with the determination that the second search term entered by the first user is found within at least one of the one or more webpages referenced in the search result that are visited by the first user, and wherein the second subset of keywords are presented to the second user as recommended keywords for replacing the first search term in the second search.

5. The apparatus of claim 4, wherein the operations include:
prior to updating the keyword library to save the respective similarity coefficient between the second search term and the first search term:
receiving a third search term entered by the first user, and
if none of the webpages in the search result of the first search term visited by the first user comprises the third search term, updating the keyword library to save the respective similarity coefficient between the second search term and the first search term.

6. The apparatus of claim 4, wherein the step of updating the keyword library to save the respective similarity coefficient between the second search term and the first search term further comprises:
determining whether the keyword library comprises the second search term, and if not, creating the respective similarity coefficient between the first search term and the second search term in accordance with the correlation value between the second search term and the first search term.

7. A non-transitory computer-readable storage medium for recommending keywords and identifying related keywords that are semantically dissimilar to a user-entered search term such that the related keywords are used as future keyword recommendations for said user-entered search term, the non-transitory computer-readable storage medium stores programs including instructions, which, when executed by a computer, cause the computer to perform operations comprising:
receiving a first search term entered by a first user for a first search;
in response to receiving the first search term entered by the first user:
searching a keyword library comprising a plurality of keywords;
retrieving a first subset of keywords based on a respective similarity coefficient between each keyword of the first subset of keywords and the first search term, wherein the first subset of keywords are provided to the first user as recommended keywords for replacing the first search term in the first search; and
generating a search result for the first search term, wherein the search result includes a plurality of web links;
recording one or more webpages referenced in the search result that are visited by the first user;
receiving a second search term entered by the first user, wherein the second search term is not present among the first subset of keywords retrieved from the keyword library in response to the first search term entered by the first user, due to deficiency of a current value of a respective similarity coefficient between the first search term and the second search term in the keyword library, wherein the deficiency results at least in part from semantic dissimilarity between the first search term and the second search term;
determining whether the second search term entered by the first user is found within at least one of the one or more webpages referenced in the search result that are visited by the first user;
in accordance with a determination that the second search term entered by the first user is found within at least one of the one or more webpages referenced in the search result that are visited by the first user:
obtaining a correlation value between the second search term and the first search term based on presence of the second search term in the at least one of the one or more webpages referenced in the search result that are visited by the first user;
increasing the respective similarity coefficient between the second search term and the first search term in accordance with the correlation value; and
updating the keyword library to save the respective similarity coefficient between the second search term and the first search term that has been increased in accordance with the correlation value between the second search term and the first search term; and
in accordance with a determination that the second search term entered by the first user is not found within at least one of the one or more webpages referenced in the search result that are visited by the first user:
forgoing obtaining the correlation value between the second search term and the first search term;
receiving the first search term as a respective search term input by a second user after the keyword library has been updated to increase the respective similarity coefficient between the second search term and the first search term in accordance with the determination that the second search term entered by the first user is found within at least one of the one or more webpages referenced in the search result that are visited by the first user; and
in response to receiving the first search term entered by the second user for a second search:
searching the updated keyword library and retrieving a second subset of keywords, wherein the second subset of keywords includes the second search term due to the increase in the respective similarity coefficient between the second search term and the first search term as a result of the update made in accordance with the determination that the second search term entered by the first user is found within at least one of the one or more webpages referenced in the search result that are visited by the first user, and wherein the second subset of keywords are presented to the second user as recommended keywords for replacing the first search term in the second search.

8. The non-transitory computer-readable storage medium of claim 7, wherein the operations include:
prior to updating the keyword library to save the respective similarity coefficient between the second search term and the first search term:
receiving a third search term entered by the first user, and
if none of the webpages in the search result of the first search term visited by the first user comprises the third search term, updating the keyword library to save the respective similarity coefficient between the second search term and the first search term.

9. The non-transitory computer-readable storage medium of claim 7, wherein the step of updating the keyword library to save the respective similarity coefficient between the second search term and the first search term further comprises:

determining whether the keyword library comprises the second search term, and if not, creating the respective similarity coefficient between the first search term and the second search term in accordance with the correlation value between the second search term and the first search term.

* * * * *